Patented June 22, 1926.

1,589,875

UNITED STATES PATENT OFFICE.

CLARENCE N. FERGUSON, OF ANN ARBOR, MICHIGAN.

PROCESS OF PRODUCING PRODUCTS HAVING A CRYSTALLINE APPEARANCE AND PRODUCTS THEREOF.

No Drawing. Application filed May 5, 1922. Serial No. 558,762.

My invention relates to a process of producing objects having a crystalline or frosted appearance by the application thereto of a coating producing an appearance of this character, and the product of said process.

The object of my invention is to provide upon various kinds of objects as, for example, glass or opaque materials such, for example, as metal &c., a coating or layer containing one or more substances which will crystallize out during the drying of the coating so as to form crystalline aggregates giving the object treated the same appearance as if the object itself were made or molded with a crystalline surface. The object of my invention is to provide such crystalline appearance by the application of many different kinds of compositions such, for example, as solutions of cellulose esters, including cellulose nitrate or cellulose acetate, also celluloid or synthetic resins or lacquer or spirituous or oleoresinous varnishes and containing substances which will crystallize out to provide the crystalline appearance when the solvents present have evaporated beyond the point of complete saturation with regard to the crystalline material. The crystalline materials used may be of many different kinds but, for example, I have used paradichlorobenzol, benzoic acid, triphenyl phosphate as well as other compounds both organic and inorganic. My invention may be applied to production of many different products as, for example, frosted glass effects, lettering upon glass, or surfaces of transparent or translucent lamp shades. It is to be understood, also, that colors of many different kinds may be incorporated to obtain the desired effect or the color of the crystalline compound may also be the source of the desired color.

My invention is capable of being carried out in many different ways but by way of illustration I shall describe only certain ways of carrying out the same hereinafter.

For example, in carrying out my invention I may make a solution containing twelve parts by weight of pyroxlin, five parts by weight of grain or wood alcohol, fifty parts by weight of acetone, forty parts by weight of a high boiling solvent having a low vapor pressure and which is non-hygroscopic such, for example, as amyl acetate; to which I add a crystallizable material of the character above referred to as, for example, forty-five parts by weight of paradichlorobenzol.

As another example of my invention I may make a composition comprising fifty parts by weight of pyroxylin, fifty parts by weight of shellac, two hundred parts by weight of grain or wood alcohol, one hundred and fifty parts by weight of acetone, two hundred parts by weight of amyl acetate, and one hundred and seventy parts by weight of triphenyl phosphate.

As an example of my invention in which the effect is obtained with a spirit varnish, I may make a composition comprising sixty-five parts by weight of shellac, one hundred and thirty-five parts by weight of wood or grain alcohol, thirty parts by weight of amyl acetate and twenty-two parts by weight of benzoic acid.

Still another example of my invention will be a composition comprising twenty parts by weight of dammar, fifty parts by weight of benzol, twenty-five parts by weight of triphenyl phosphate, fifteen parts by weight of petroleum naphtha, with or without addition of drying oils, driers, etc. As still another example I may make a composition containing fifteen parts by weight of "Bakelite" lacquer, comprised of 25% by weight of "Bakelite" in a solvent comprising acetic ether, fusel oil and acetone oil, to which I add twelve parts by weight of triphenyl phosphate which when applied to the object by coating, spraying or dipping will cause the crystalline substances to crystallize out upon drying to give the crystallized effect.

To such composition, also, any desired color as, for example, any aniline color in any desired proportion, may be added.

The object to be treated, as, for example, a plate of glass, is coated or sprayed with or dipped into any one of said compositions until a uniform coating of the desired thickness is obtained and is then allowed to dry in a warm dry atmosphere. As soon as the solvents have evaporated beyond the point of saturation with regard to the crystallizable constituent the latter crystallizes out forming a crystalline aggregate usually in radiating designs having a very attractive appearance. If desired any suitable coloring material may be introduced into any one of the above compositions as, for example, an aniline color in any desired quantity to produce the desired depth of shade.

While I have described my invention above in detail, I wish it to be understood that many changes may be made therein without departing from the spirit of the same.

I claim:

1. A water-insoluble film containing a cellulose ester and a crystallized organic compound presenting an opalescent, continuously crystalline formation.

2. A water-insoluble film containing a cellulose ester, a gum resin and triphenyl phosphate, the latter predominating over the ester by over 2 to 1 and being in an opalescent, continuously crystalline formation.

3. A water-insoluble film containing about fifty parts of weight of pyroxylin and about fifty parts shellac, together with a proportion of amyl acetate, said film being opalescent and having a continuously crystalline formation.

4. The process of producing the film of claim 1, comprising preparing a solution of the ingredients in an organic volatilizable solvent, and then applying the solution to the surface to be coated and allowing the film to dry.

5. The process of producing the film of claim 2 comprising preparing a solution of the ingredients with alcohol and acetone, and then applying the solution to the surface to be coated and allowing the film to dry.

6. The process of producing the film of claim 3, comprising preparing a solution of the ingredients with alcohol and acetone, and then applying the solution to the surface to be coated, and allowing the film to dry.

In testimony that I claim the foregoing, I have hereunto set my hand this 29th day of April, 1922.

CLARENCE N. FERGUSON.